US008982158B2

(12) United States Patent
Chen et al.

(10) Patent No.: US 8,982,158 B2
(45) Date of Patent: Mar. 17, 2015

(54) COMPUTER SCREEN IMAGE DISPLAYING METHOD, COMPUTER HAVING A VERTICAL DISPLAY DEVICE, AND COMPUTER PROGRAM PRODUCT

(75) Inventors: Yu-Ping Chen, Taipei Hsien (TW); Ming-Hung Tsai, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 822 days.

(21) Appl. No.: 12/630,020

(22) Filed: Dec. 3, 2009

(65) Prior Publication Data

US 2010/0245391 A1     Sep. 30, 2010

(30) Foreign Application Priority Data

Mar. 27, 2009 (TW) .................. 98110203 A

(51) Int. Cl.
*G09G 5/32* (2006.01)
*G06F 3/14* (2006.01)

(52) U.S. Cl.
CPC ...... *G06F 3/1415* (2013.01); *G09G 2340/0464* (2013.01); *G09G 2370/04* (2013.01)
USPC ........................................................ 345/649

(58) Field of Classification Search
CPC ....................................................... G09G 5/00
USPC ........................................................ 345/649
See application file for complete search history.

(56) References Cited

U.S. PATENT DOCUMENTS

| 5,661,632 | A  | * | 8/1997  | Register ...................... 361/679.3 |
| 6,453,173 | B1 | * | 9/2002  | Reber et al. .................... 455/557 |
| 6,684,254 | B1 | * | 1/2004  | Dutta ............................ 709/229 |
| 6,781,587 | B2 | * | 8/2004  | Grigor .......................... 345/533 |
| 6,885,478 | B1 | * | 4/2005  | Salgado et al. ................ 358/449 |
| 6,963,344 | B1 |   | 11/2005 | Kasprzak et al. |
| 7,884,836 | B2 | * | 2/2011  | Hussain ......................... 345/649 |
| 8,055,776 | B1 | * | 11/2011 | Dutta ............................ 709/227 |
| 2001/0011993 | A1 | * | 8/2001  | Saarinen ....................... 345/156 |
| 2002/0149594 | A1 | * | 10/2002 | Grigor .......................... 345/536 |
| 2002/0190947 | A1 | * | 12/2002 | Feinstein ....................... 345/158 |
| 2003/0122781 | A1 | * | 7/2003  | Koo .............................. 345/158 |
| 2003/0222848 | A1 | * | 12/2003 | Solomon et al. .............. 345/156 |
| 2004/0201595 | A1 | * | 10/2004 | Manchester ................... 345/649 |

(Continued)

OTHER PUBLICATIONS

Dutta, Rabindranath Austin, Texas. U.S. Appl. No. 09/583,346 dated May 31, 2000.*

(Continued)

*Primary Examiner* — Javid A Amini
(74) *Attorney, Agent, or Firm* — Amin, Turocy & Watson, LLP

(57) ABSTRACT

A computer screen image displaying method is executed after power-on of a computer and includes: receiving data associated with a detected default display mode of a BIOS of the computer and a display mode stored in a display device coupled to the computer; and determining if the default display mode of the BIOS and the display mode of the display panel match, and if so, causing a video controller of the computer to output image signals according to the display mode of the display panel, and if not, causing the video controller to output image signals corresponding to the default display mode of the BIOS. Thus, screen orientation can be controlled during BIOS POST to spare the user the trouble of changing screen orientation under an operating system environment, thereby enhancing efficiency and saving system resources.

9 Claims, 3 Drawing Sheets

(56) References Cited

U.S. PATENT DOCUMENTS

| | | | |
|---|---|---|---|
| 2004/0257385 A1* | 12/2004 | Kim et al. | 345/649 |
| 2005/0264560 A1* | 12/2005 | Hartkop et al. | 345/419 |
| 2005/0283596 A1* | 12/2005 | Chen et al. | 713/1 |
| 2006/0048062 A1* | 3/2006 | Adamson | 715/760 |
| 2007/0013784 A1* | 1/2007 | Kim | 348/208.4 |
| 2007/0132783 A1* | 6/2007 | Lim et al. | 345/629 |
| 2009/0059305 A1* | 3/2009 | Ricard | 358/3.23 |
| 2009/0147028 A1* | 6/2009 | Sefton et al. | 345/690 |
| 2009/0289958 A1* | 11/2009 | Kim et al. | 345/649 |
| 2010/0194692 A1* | 8/2010 | Orr et al. | 345/173 |
| 2011/0029869 A1* | 2/2011 | McLennan | 715/702 |
| 2012/0050161 A1* | 3/2012 | Andersson et al. | 345/158 |

OTHER PUBLICATIONS

Taiwanese Office Action for Taiwanese Application No. 098110203 dated Jul. 30, 2012.

* cited by examiner

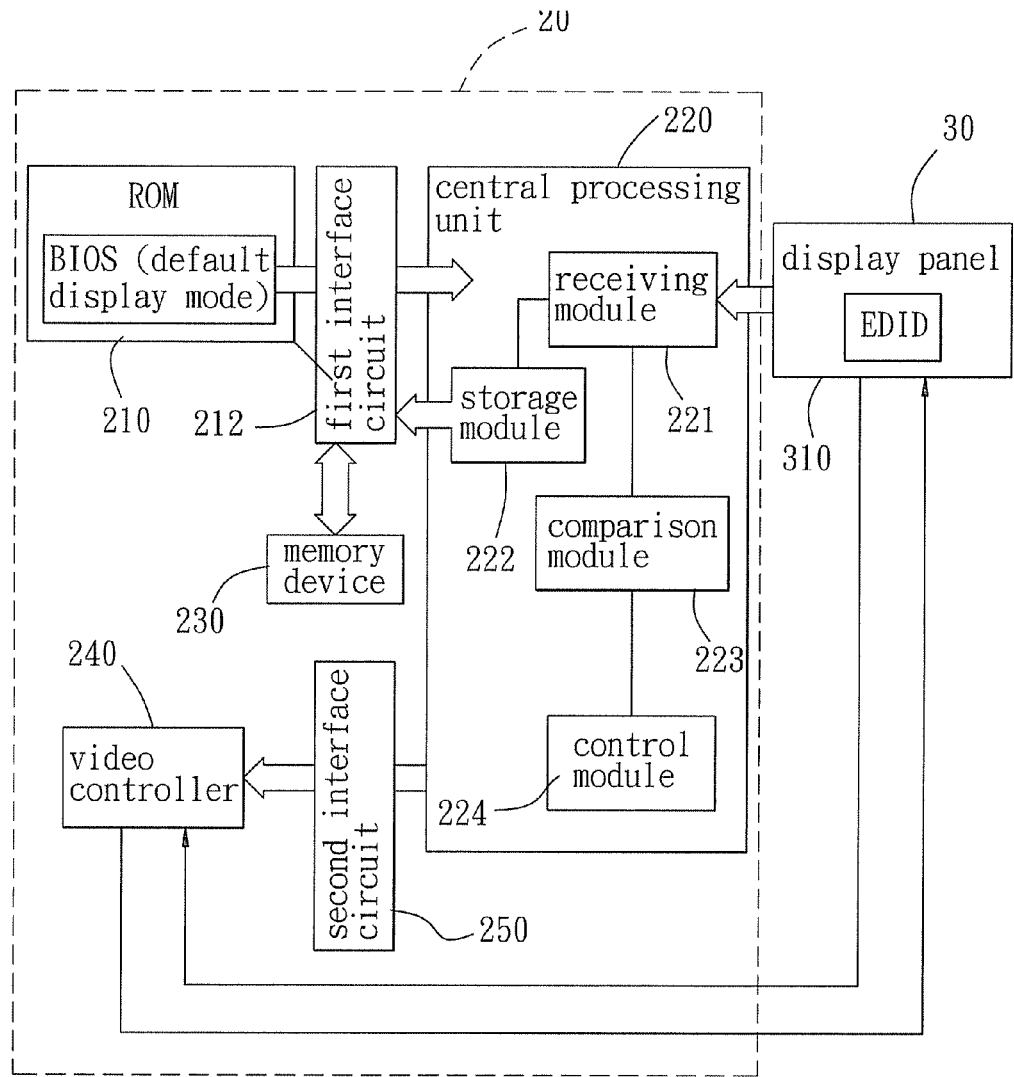
F I G. 2

US 8,982,158 B2

COMPUTER SCREEN IMAGE DISPLAYING METHOD, COMPUTER HAVING A VERTICAL DISPLAY DEVICE, AND COMPUTER PROGRAM PRODUCT

CROSS-REFERENCE TO RELATED APPLICATION

This application claims priority of Taiwanese Application No. 098110203, filed on Mar. 27, 2009.

BACKGROUND OF THE INVENTION

1. Field of the Invention

The invention relates to a basic input/output system (BIOS) of a computer, more particularly to a computer screen image displaying method for execution by a basic input/output system of a computer having a vertical display device.

2. Description of the Related Art

With the fast development of computer technology, current computers and their peripheral equipment are capable of providing users with various choices and meeting users' requirements in various operations. For instance, a vertical display screen enables a user to view more content when browsing a document or a web page through a computer display screen.

In conventional methods which permit switching between landscape and portrait display modes, display signals are rotated before being outputted primarily through use of software. This, however, means relatively heavy workloads on the central processing unit of a computer.

In recent years, settings of the operating system of a computer can be modified to enable a video controller to change screen orientation. The video controller will rotate text and images during display processing so that the text and images are displayed in a portrait orientation. However, all of the above methods of rotating a display screen require the user to make the settings under an operating system environment after selecting a desired screen orientation, and execution of the settings by the operating system involves much time and considerable system resources. For a display device that is specifically designed to operate in a portrait display mode, conventional portrait display methods are evidently not better solutions.

SUMMARY OF THE INVENTION

The present invention is essentially directed to a vertical display device configuration whereby a computer assembler or user does not need to make settings or install software for screen rotation under an operating system environment and whereby a computer screen can be set to display images in a portrait orientation using the least time and the least system resources.

The resolution supported by extended display identification data (EDID) of a display panel of a vertical display device is ideally that of a portrait display mode, e.g., 768×1024. However, since the display market is dominated by horizontal display devices, the resolution supported by the EDID of currently available display panels is that of a landscape display mode, e.g., 1024×768. Under such circumstance, manufacturers of vertical display devices may need to use display panels designed for the landscape display mode. The applicants therefore contemplated a computer screen image displaying method that is suitable for both a display panel designed for the portrait display mode and a display panel designed for the landscape display mode. The display panel stores EDID content and supports a transmission interface memory, such as $I^2C$. Thus, a computer that executes a boot-up procedure according to BIOS of the present invention is capable of providing the effect of a portrait display mode regardless of whether the display panel is of a vertical type or a horizontal type.

Accordingly, an object of the present invention is to provide a computer screen image displaying method that can cause a computer screen to display images in a portrait orientation through execution of a basic input/output system (BIOS).

Another object of the present invention is to provide a computer having a vertical display device, which is capable of displaying images in a portrait orientation after execution of a basic input/output system (BIOS) at booting.

Still another object of the present invention is to provide a computer program product comprising a computer readable storage medium having a basic input/output system (BIOS) stored therein. The computer readable storage medium may be a read-only-memory (ROM) or a flash ROM. When a central processing unit of a computer reads the BIOS from the storage medium and executes the BIOS, the computer screen image displaying method of the invention can be carried out.

Yet another object of the present invention is to provide a computer program product comprising a computer readable medium having a set of computer readable instructions stored therein which, when executed by a computer, cause the computer to execute the computer screen image displaying method of the present invention.

Accordingly, the computer screen image displaying method of the present invention is suitable for use in a computer with a basic input/output system (BIOS) that is factory-preset to operate in a portrait display mode, and in a computer having a BIOS that allows a user to change a default display mode. The method is executed after power-on of a computer when a central processing unit of the computer reads and executes a basic input/output system (BIOS) stored in a memory device through a first interface circuit to begin hardware detection and boot image display (generally known as the start of POST), and comprises the following steps:

(A) receiving, through a receiving module of the central processing unit, data associated with a detected default display mode of the BIOS and the display mode stored in a display panel of a display device coupled to the computer, the display mode of the display panel being determinable from extended display identification data (EDID) of the display panel:

The EDID is format-related data stored in a memory device of the display panel and includes basic parameters of the display device, such as manufacturer name, product serial number, supported resolution, etc., which are factory-set parameters. Therefore, in an embodiment of the present invention, the display mode of the display panel is determined by detecting the supported resolution of the display panel. For example, for a display panel with a supported resolution of 768×1024, 768 being the total number of pixels across the width of the screen, and 1024 being the total number of pixels across the height of the screen, since the number of width pixels is less than the number of height pixels, it can be determined that the EDID of the display panel supports a portrait display mode. Conversely, for a display panel with a supported resolution of 1024×768, since the number of width pixels is greater than the number of height pixels, it can be determined that the EDID of the display panel supports a landscape display mode.

(B) determining, through a comparison module of the central processing unit, if the default display mode of the BIOS matches the display mode of the display panel; and if so, causing a control module of the central processing unit to issue a control signal to a video controller (a display card) of the computer through a second interface circuit to cause the video controller to output image signals according to the EDID and to continue with a next step of the POST; and if not, causing the control module to issue a control signal to the video controller via the second interface circuit to cause the video controller to output image signals corresponding to the default display mode of the BIOS and to continue with the next step of the POST.

The method of the present invention may further include step (C) before step (B). In step (C), a storage module coupled to the receiving module is used to record the default display mode of the BIOS in a memory device through the first interface circuit. The memory device may be a non-volatile random-access memory (NV RAM).

In the computer screen image displaying method according to the present invention, if the EDID of the display panel supports the portrait display mode, and the default display mode of the BIOS is the portrait display mode, after the determination in step (B), the display panel displays images in the portrait orientation according to the EDID. The advantageous effect of the present invention is particularly evident when the EDID of the display panel supports the landscape display mode whereas the default display mode of the BIOS is the portrait display mode. In this case, the video controller is caused to change the output format of the screen without requiring a software application for conversion of the output signals, so that the user does not need to change the settings under an operating system environment. Thus, the display panel can be made to display images in the portrait display mode in the fastest manner and using the least system resources. In addition, apart from being capable of enabling the display panel to display images in the portrait display mode, the present invention also permits the display device to display images in the landscape display mode if needed or desired, as long as the product designer or the user sets or modifies the default display mode through the BIOS settings.

BRIEF DESCRIPTION OF THE DRAWINGS

Other features and advantages of the present invention will become apparent in the following detailed description of the preferred embodiment with reference to the accompanying drawings, of which:

FIG. 2 is a system block diagram illustrating a preferred embodiment of the present invention.

DETAILED DESCRIPTION OF THE PREFERRED EMBODIMENT

Figure 1:
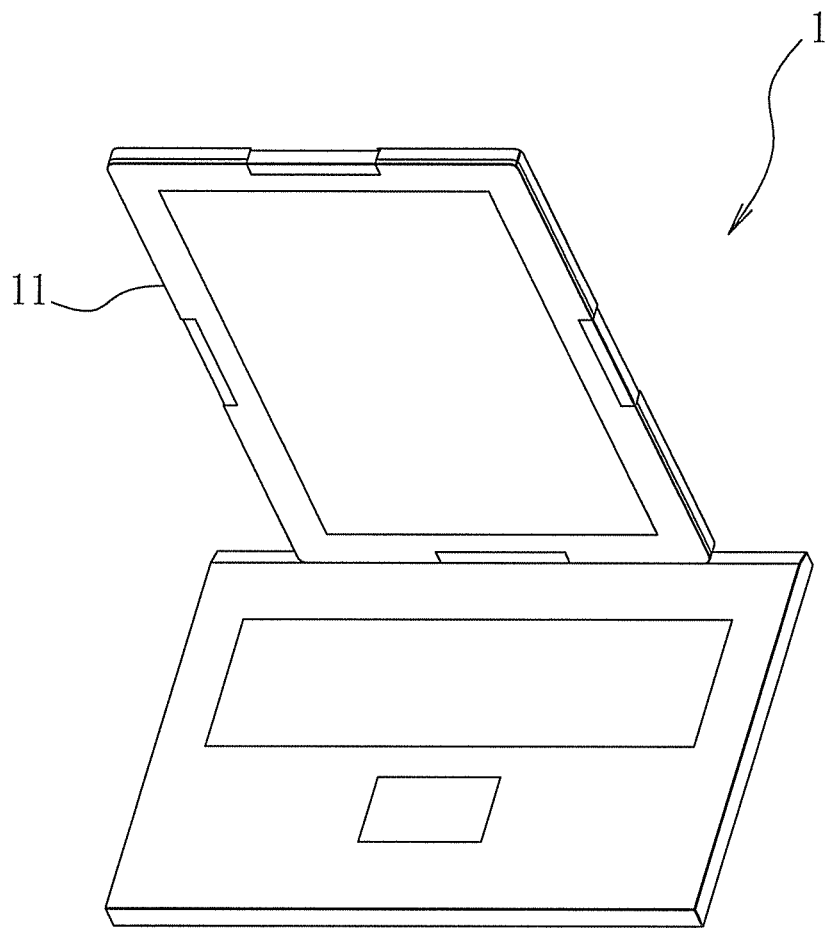
FIG. 1 is a schematic view to illustrate a computer having a vertical display device according to the present invention.

The preferred embodiment of a computer screen image displaying method according to the present invention is suitable for use in a computer 1 having a vertical display device 11 as shown in FIG. 1. However, the computer 1 is not limited to the notebook computer as shown in FIG. 1, and may be any other type of computer, such as a desktop.

The computer screen image displaying method of the present invention is realized via a basic input/output system (BIOS) of the computer 1. FIG. 2 illustrates a system block diagram of a computing device 20 of the computer 1, and a display panel 30 of the display device 11. The computing device 20 includes a read-only-memory (ROM) 210 that stores BIOS program instructions, and a central processing unit 220 that reads and executes the program instructions resident in the BIOS stored in the ROM 210 through a first interface circuit 212 for executing a boot-up procedure. The program instructions include functions of configuring the central processing unit 220, testing the dynamic random-access memory, initializing chipsets and peripherals, driving hard disks, etc.

In this embodiment, the central processing unit 220 is electrically coupled to the ROM 210 through the first interface circuit 212, and is electrically coupled to a video controller 240 through a second interface circuit 250. A memory device 230 is electrically coupled to the first interface circuit 212 for storing data or instructions being executed by the central processing unit 220.

The display panel 30 includes a memory device 310 for storing extended display identification data (EDID) of the display panel 30 and that is compatible with a transmission interface, such as $I^2C$. The display panel 30 receives and displays an image signal transmitted from the video controller 240, and the memory device 310 thereof is electrically coupled to the video controller 240.

Figure 3:
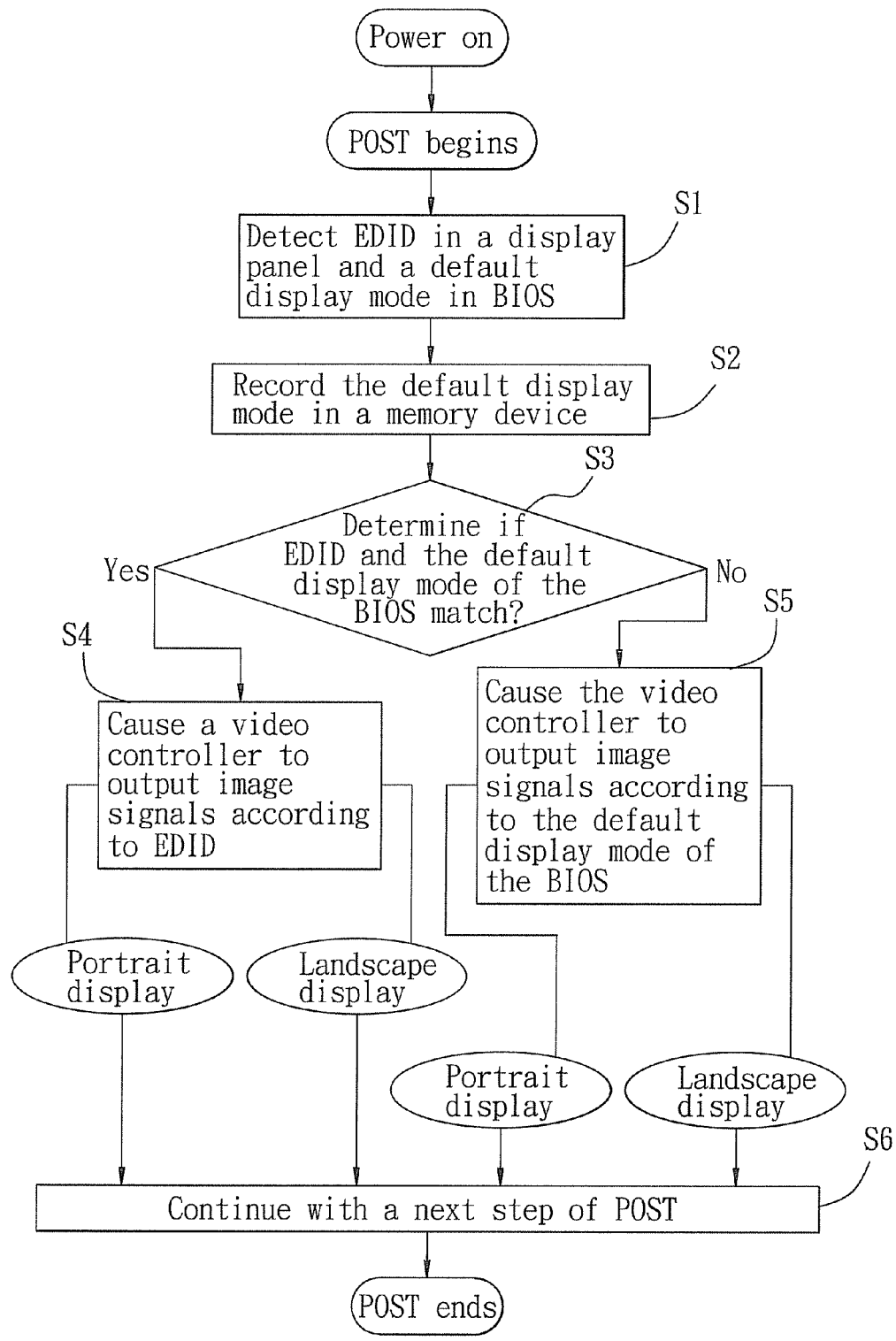
FIG. 3 is a flowchart to illustrate a preferred embodiment of a computer screen image displaying method according to the present invention.

Since the default display mode of the BIOS of the computer 1 having the vertical display device 11 according to the present invention may be factory-preset to be a portrait display mode or the computer 1 is configured to allow a user to change the default display mode, the method of the present invention has to be adapted to suit such situations. FIG. 3 illustrates a flowchart of the method according to the present invention. When the computer 1 is powered on, the central processing unit 220 reads and executes the BIOS program to thereby start hardware detection and boot image display, i.e., the start of the so-called power-on self-test (POST) procedure. The method of the present invention is then executed until the POST procedure is run to completion. The boot image herein refers to the image commonly known as the BIOS POST image or the POST image.

The preferred embodiment of a computer screen image displaying method according to the present invention comprises the following steps:

In step S1, a receiving module 221 of the central processing unit 220 receives data associated with the detected default display mode of the BIOS and the EDID stored in the memory device 310 of the display panel 30. The data associated with the default display mode is recorded in the BIOS and stored in the ROM 210. The EDID refers to parameters factory-stored in the display device 11, and includes basic parameters of the display device 11, e.g., manufacturer name, product serial number, supported resolution, etc., which are stored in the memory 310 of the display panel 30.

In step S2, a storage module 222 of the central processing unit 220 which is coupled to the receiving module 221 records the detected default display mode data in the memory device 230. The memory device 230 may be a non-volatile random-access memory (NV RAM) that permits reading of data therefrom in subsequent steps.

In step S3, a comparison module 223 of the central processing unit 220 which is coupled to the receiving module 221 determines if the default display mode of the BIOS matches the display mode supported by the display panel 30 as contained in the EDID. For example, the default display mode of the BIOS is portrait and the EDID of the display panel 30 supports portrait display, or the default display mode of the BIOS is landscape, and the EDID of the display panel 30 supports landscape display. If the default display mode of the BIOS is determined to match the display mode supported by the display panel 30, a control module 224 of the central processing unit 220 which is coupled to the comparison module 223 performs step S4 to cause the video controller 240 to output image signals according to the EDID. At this point, if the default display mode of the BIOS and the display mode supported by the EDID of the display panel 30 are portrait, images on a screen of the display panel 30 will be displayed in the portrait orientation. On the other hand, if the default display mode of the BIOS and the display mode supported by the EDID of the display panel 30 are landscape, this indicates that the product designer or the user has deliberately configured or modified the default display settings of the BIOS and intends to display images in the landscape orientation, and images will be displayed in the landscape orientation after the determination is made in this step. Furthermore, if it is determined in step S3 that the default display mode of the BIOS and the display mode supported by the EDID of the display panel 30 do not match, e.g., the default display mode of the BIOS is landscape whereas the EDID supports portrait, step S5 is performed, in which the control module 224 causes the video controller 240 to output image signals complying with the default display mode of the BIOS. In other words, if the EDID supports the landscape display mode but the default display mode of the BIOS is portrait, the control module 224 issues a rotation command to the video BIOS (VBIOS) of the video controller 240 so that all the display signals to be transmitted to the display panel 30 are in the portrait orientation. On the contrary, if the EDID supports the portrait display mode but the default display mode of the BIOS is landscape, the video controller 240 outputs landscape image signals according to the default display mode of the BIOS.

Steps S4 and S5 are followed by step S6 to continue with a next step of the POST procedure until the POST procedure ends.

In sum, regardless of whether the EDID of the display panel 30 supports the landscape display mode or the portrait display mode, as long as the BIOS is not preset by the product designer or the user to the landscape display mode, after executing the BIOS capable of realizing the method of the present invention during the boot-up process, the object of displaying images in the portrait orientation can be achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A computer screen image displaying method, which is executed after power-on of a computer when a central processing unit of the computer reads and executes a basic input/output system (BIOS) stored in a memory device to begin hardware detection and image display, said computer screen image displaying method comprising:
   receiving, through a receiving module of the central processing unit, data associated with a default display mode of the BIOS and a display mode stored in a display panel coupled to the computer; and
   determining, through a comparison module of the central processing unit, if the default display mode of the BIOS matches the display mode of the display panel;
   and if so, causing a control module of the central processing unit to issue via an interface circuit of the control module a control signal, which contains information associated with the display mode of the display panel, to a video controller of the computer to cause the video controller to output image signals according to the display mode stored in the display panel; and if not, causing the control module to issue a control signal to the video controller to cause the video controller to output image signals corresponding to the default display mode of the BIOS, wherein the control module issues the control signal during a power on self test procedure during a boot-up of the computer and before initiation of an operating system.

2. The computer screen image displaying method of claim 1, wherein the display mode stored in the display panel is determined from supported resolution in extended display identification data (EDID) of the display panel.

3. The computer screen image displaying method of claim 1, wherein, when the display mode of the display panel is a landscape display mode and the default display mode of the BIOS is a portrait display mode, the control module of the central processing unit of the computer issues a command to video BIOS of the video controller to cause the video controller to output image signals corresponding to the default display mode of the BIOS.

4. The computer screen image displaying method of claim 1, wherein the default display mode of the BIOS is recorded in a non-volatile random-access memory using a storage module of the central processing unit and through a first interface circuit.

5. A computer comprising:
   a display device including a display panel, said display panel being provided with a display memory device for storing extended display identification data (EDID);
   and a computing device including
      a computing memory device storing a basic input/output system (BIOS),
      a video controller coupled to said display panel of said display device, and
      a central processing unit which is configured such that, after power-on and during a power on self test procedure, said central processing unit reads and executes said BIOS stored in said computing memory device, receives, through a receiving module thereof, data associated with a default display mode of said BIOS and said EDID stored in said display panel, determines a display mode of said display panel from said EDID, and determines, through a comparison module thereof, if the default display mode of said BIOS matches the display mode of said display panel, and if so, said central processing unit causes a control module thereof to issue via an interface circuit of the control module a control command, which contains information associated with the display mode of the display panel, to said video controller to cause said video controller to output image signals according to the display mode determined from said EDID, and if not, said central processing unit causes said control module to issue a control signal to said video controller to cause said video controller to output image signals corresponding to the default display mode of said BIOS and before initiation of an operating system.

6. A computer program product comprising a non-transitory computer readable medium having a set of computer readable instructions stored therein which, when executed by a computer, causes the computer to execute a computer screen image displaying method, which comprises:
   receiving, through a receiving module of the central processing unit, data associated with a detected default display mode of a BIOS of the computer and a display mode stored in a display panel coupled to the computer;

and determining, through a comparison module of the central processing unit, if the default display mode of the BIOS matches the display mode of the display panel; and if so, causing a control module of the central processing unit to issue via an interface circuit of the control module a control signal, which contains information associated with the display mode of the display panel, to a video controller of the computer to cause the video controller to output image signals according to the display mode stored in the display panel; and if not, causing the control module to issue a control signal to the video controller to cause the video controller to output image signals corresponding to the default display mode of the BIOS, wherein the control module issues the control signal during a power on self test procedure during a boot-up of the computer and before initiation of an operating system.

7. The computer program product of claim 6, wherein the display mode stored in the display panel is determined from supported resolution in extended display identification data (EDID) of the display panel.

8. The computer program product of claim 6, wherein, when the display mode of the display panel is a landscape display mode and the default display mode of the BIOS is a portrait display mode, the control module of the central processing unit of the computer issues a command to video BIOS of the video controller to cause the video controller to output image signals corresponding to the default display mode of the BIOS.

9. The computer program product of claim 6, wherein the default display mode of the BIOS is recorded in a non-volatile random-access memory using a storage module of the central processing unit and through a first interface circuit.

* * * * *